(12) United States Patent
Nishikawa et al.

(10) Patent No.: US 11,356,360 B2
(45) Date of Patent: Jun. 7, 2022

(54) INFORMATION PROCESSING SYSTEM AND INFORMATION PROCESSING METHOD

(71) Applicant: SONY CORPORATION, Tokyo (JP)

(72) Inventors: Kana Nishikawa, Tokyo (JP); Junki Ohmura, Tokyo (JP); Hiroaki Ogawa, Chiba (JP); Keisuke Touyama, Tokyo (JP); Yasushi Tsuruta, Tokyo (JP); Shinobu Kuriya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/641,690

(22) PCT Filed: Aug. 22, 2018

(86) PCT No.: PCT/JP2018/030904
§ 371 (c)(1),
(2) Date: Feb. 25, 2020

(87) PCT Pub. No.: WO2019/049661
PCT Pub. Date: Mar. 14, 2019

(65) Prior Publication Data
US 2020/0228445 A1   Jul. 16, 2020

(30) Foreign Application Priority Data
Sep. 5, 2017   (JP) .............................. JP2017-169968

(51) Int. Cl.
*H04L 45/30*   (2022.01)
*H04L 45/302*   (2022.01)
(Continued)

(52) U.S. Cl.
CPC ............ *H04L 45/306* (2013.01); *G06F 3/167* (2013.01); *G06F 9/542* (2013.01); *H04L 12/18* (2013.01)

(58) Field of Classification Search
CPC ....... H04L 45/306; H04L 12/18; G06F 3/167; G06F 9/542; G06Q 10/063112;
(Continued)

(56) References Cited

U.S. PATENT DOCUMENTS

| 2014/0101556 A1 | 4/2014 | Pinard |
| 2014/0297470 A1* | 10/2014 | Ramadge ........... G06Q 30/0635 705/26.41 |

(Continued)

FOREIGN PATENT DOCUMENTS

| CA | 2887070 A1 | 4/2014 |
| CA | 2975669 A1 | 4/2014 |

(Continued)

OTHER PUBLICATIONS

International Search Report and Written Opinion of PCT Application No. PCT/JP2018/030904, dated Oct. 30, 2018, 09 pages of ISRWO.

(Continued)

*Primary Examiner* — Tan Doan
(74) *Attorney, Agent, or Firm* — Chip Law Group

(57) ABSTRACT

The present technology relates to an information processor, an information processing method, and a program that are able to convey information with a higher reliability. An information processor according to an aspect of the present technology generates a conveyance route as a route to a node of a conveyance destination, the conveyance route including, as transit nodes, a node of a device and a node of a person, and outputs information that indicates a conveyance content along the conveyance route. The present technology is applicable to an agent apparatus that assists an action of a user.

13 Claims, 11 Drawing Sheets

(51) Int. Cl.
*G06F 3/16* (2006.01)
*G06F 9/54* (2006.01)
*H04L 12/18* (2006.01)

(58) Field of Classification Search
CPC ............ G06Q 10/083; G06Q 30/0635; G08G 1/0112; G08G 1/20
USPC .......................................................... 709/238
See application file for complete search history.

(56) References Cited

U.S. PATENT DOCUMENTS

| | | | |
|---|---|---|---|
| 2015/0134761 | A1 | 5/2015 | Sharma et al. |
| 2015/0249718 | A1 | 9/2015 | Huybregts et al. |
| 2016/0328781 | A1* | 11/2016 | Patel-Zellinger ............................ G06Q 30/0635 |
| 2017/0091682 | A1 | 3/2017 | Pinard |
| 2018/0107445 | A1 | 4/2018 | Ohmura |
| 2018/0268359 | A1* | 9/2018 | Soubhagya ...... G08G 1/096741 |
| 2018/0308477 | A1* | 10/2018 | Nagasaka ................ H04Q 9/00 |

FOREIGN PATENT DOCUMENTS

| | | |
|---|---|---|
| CA | 2939001 A1 | 9/2015 |
| CN | 105723684 A | 6/2016 |
| CN | 106062710 A | 10/2016 |
| CN | 107408028 A | 11/2017 |
| EP | 2904555 A1 | 8/2015 |
| EP | 3069497 A1 | 9/2016 |
| EP | 3111383 A1 | 1/2017 |
| EP | 3279791 A1 | 2/2018 |
| JP | 2003-296268 A | 10/2003 |
| JP | 2004-015169 A | 1/2004 |
| JP | 2008-186107 A | 8/2008 |
| JP | 2017-504859 A | 2/2017 |
| JP | 2017-516167 A | 6/2017 |
| KR | 10-2016-0086364 A | 7/2016 |
| KR | 10-2016-0127117 A | 11/2016 |
| MX | 2016011044 A | 10/2016 |
| RU | 2016134910 A | 3/2018 |
| TW | 201535156 A | 9/2015 |
| WO | 2014/053051 A1 | 4/2014 |
| WO | 2015/073722 A1 | 5/2015 |
| WO | 2015/130859 A1 | 9/2015 |
| WO | 2016/157658 A1 | 10/2016 |
| WO | 2016/158792 A1 | 10/2016 |

OTHER PUBLICATIONS

Mizoguchi, et al., "Proposal of real world communication support method using intermediary", IPSJ Symposium/The First Workshop on Groupware and Network Services, Nov. 4, 2004, pp. 33-38.

* cited by examiner

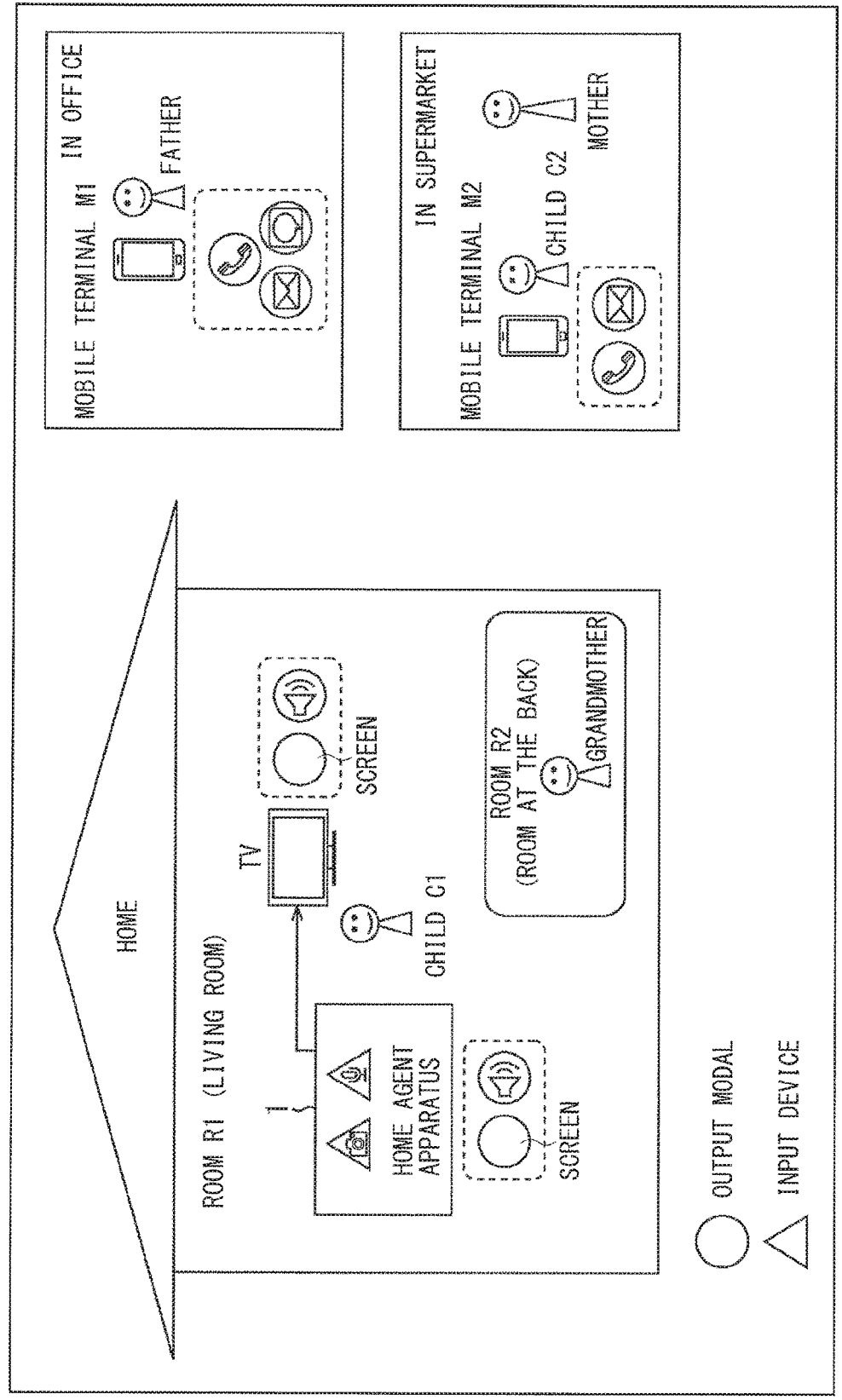
[FIG. 1]

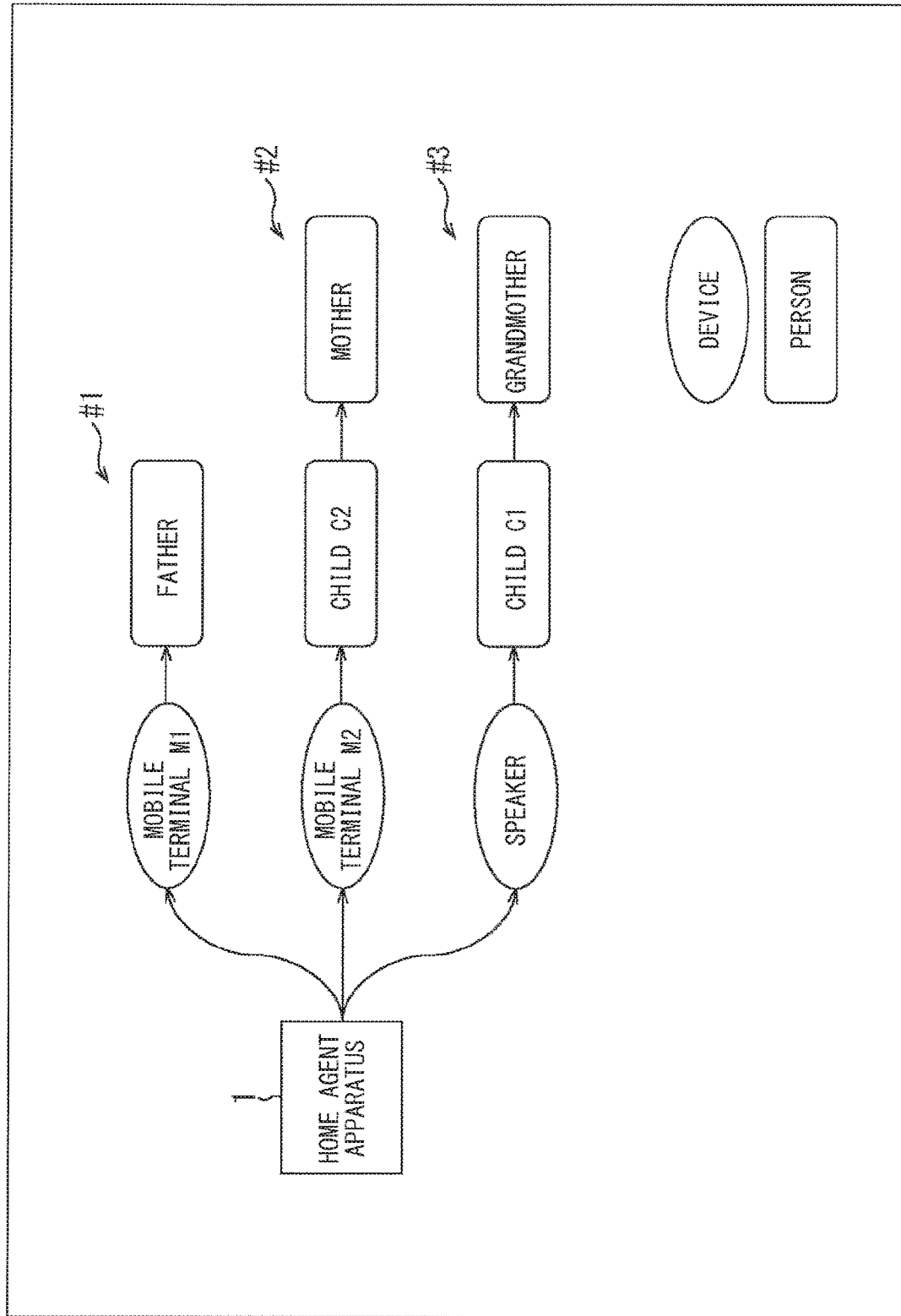
[FIG. 2]

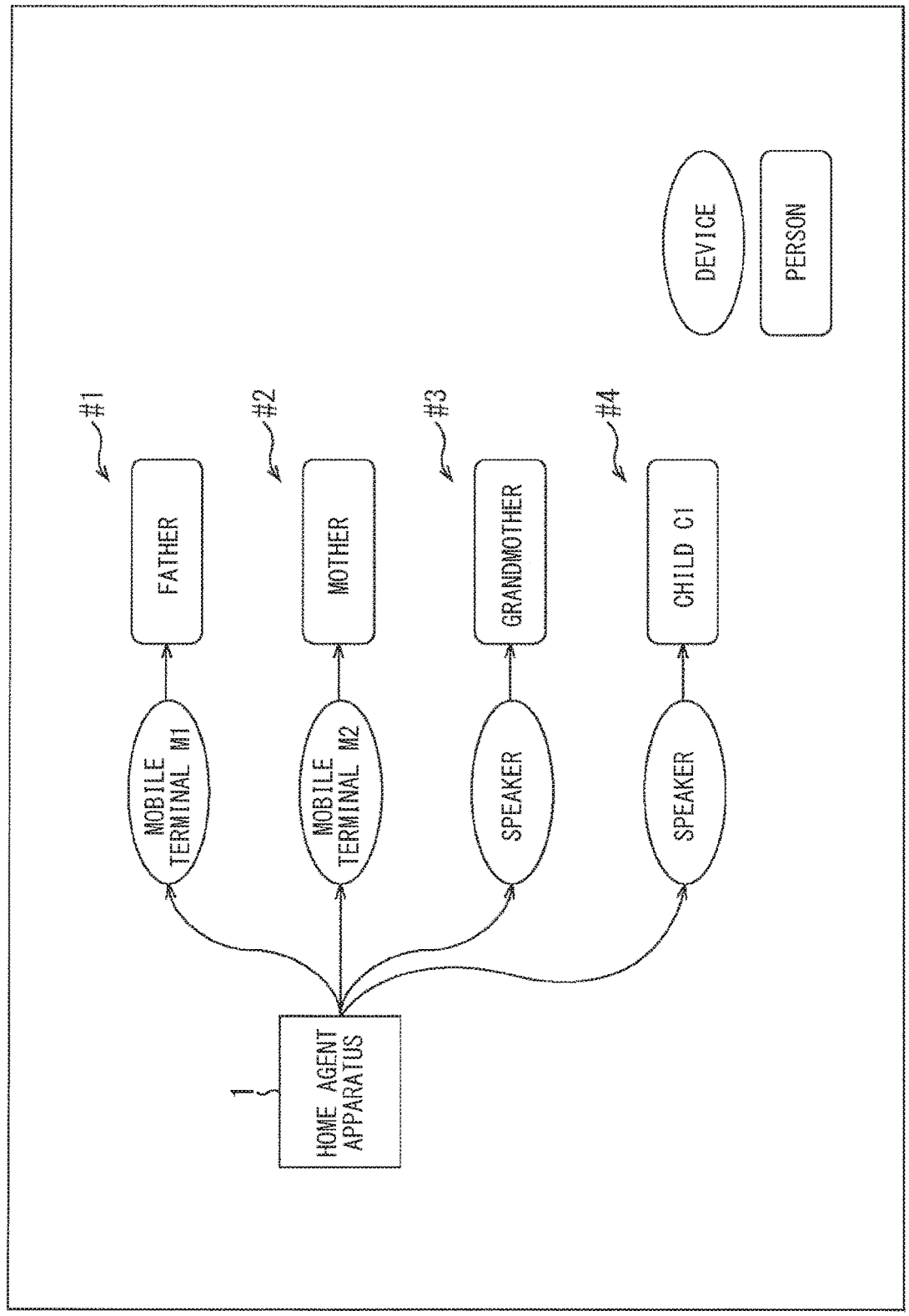
[FIG. 3]

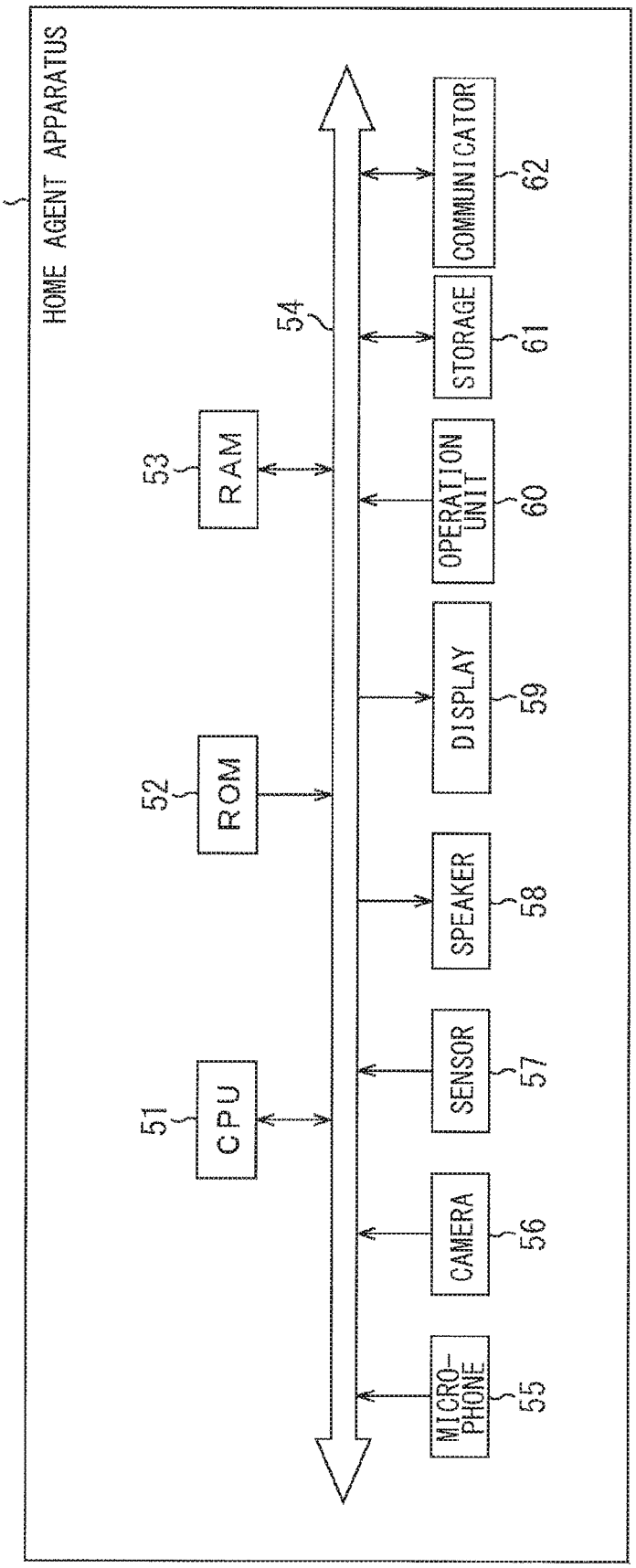
[FIG. 4]

[FIG. 5]
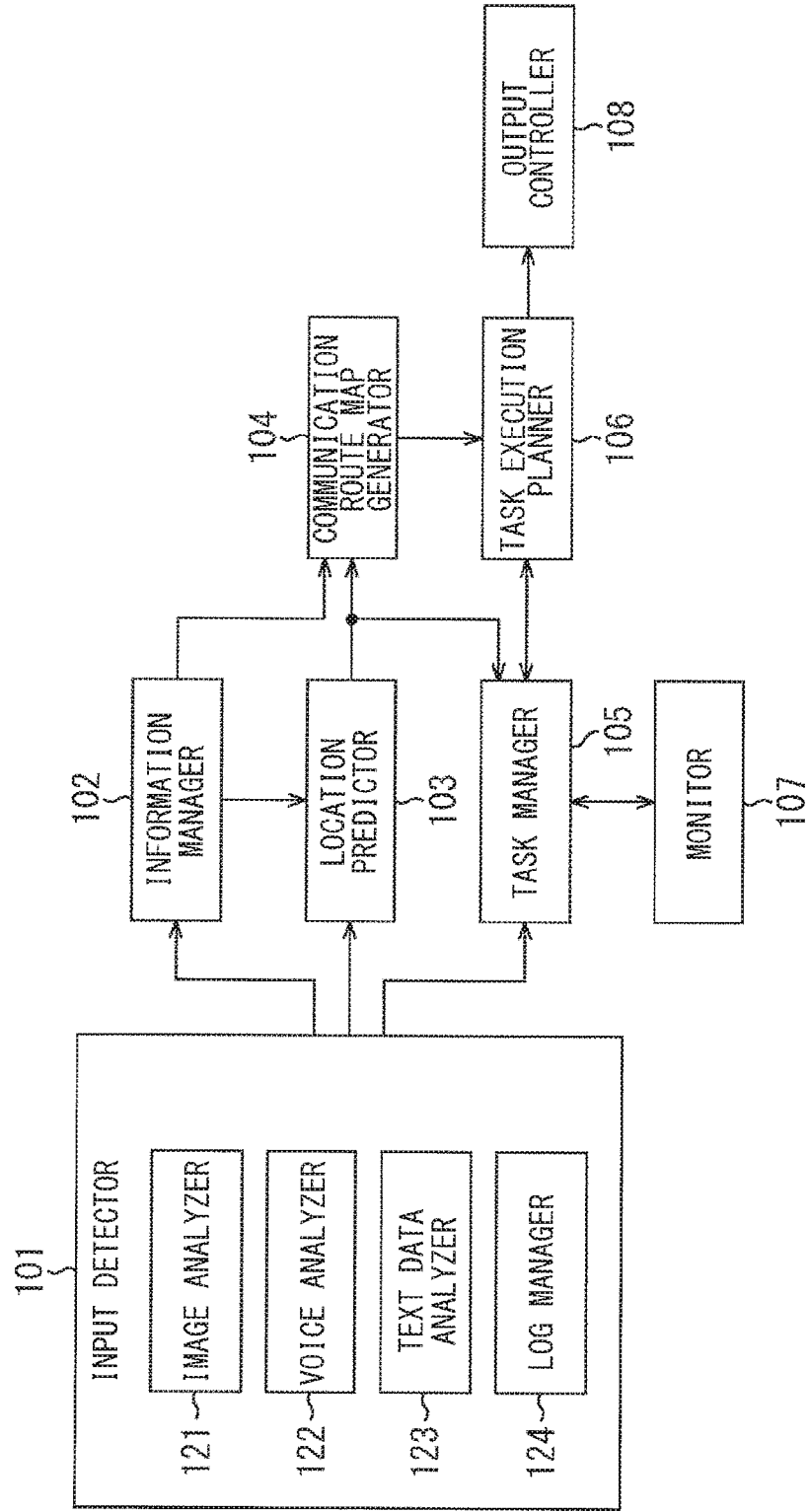

[FIG. 6]

| TASK | REQUESTER | POSSIBLE EXECUTOR | DEADLINE | URGENCY LEVEL | DIFFICULTY LEVEL |
|---|---|---|---|---|---|
| BUY MILK | GRANDMOTHER | FATHER MOTHER | BY 18:30 | 5 | 1 |
| DELIVER LUNCH BOX TO SCHOOL | MOTHER | GRANDMOTHER | BY 11:30 | 5 | 1 |
| BUNDLE OLD NEWSPAPERS | MOTHER | FATHER GRANDMOTHER CHILD C1 CHILD C2 | NONE | 1 | 1 |
| GO TO SCHOOL FOR PICK UP | MOTHER | GRANDMOTHER | BY 17:30 | 5 | 1 |

[FIG. 7]
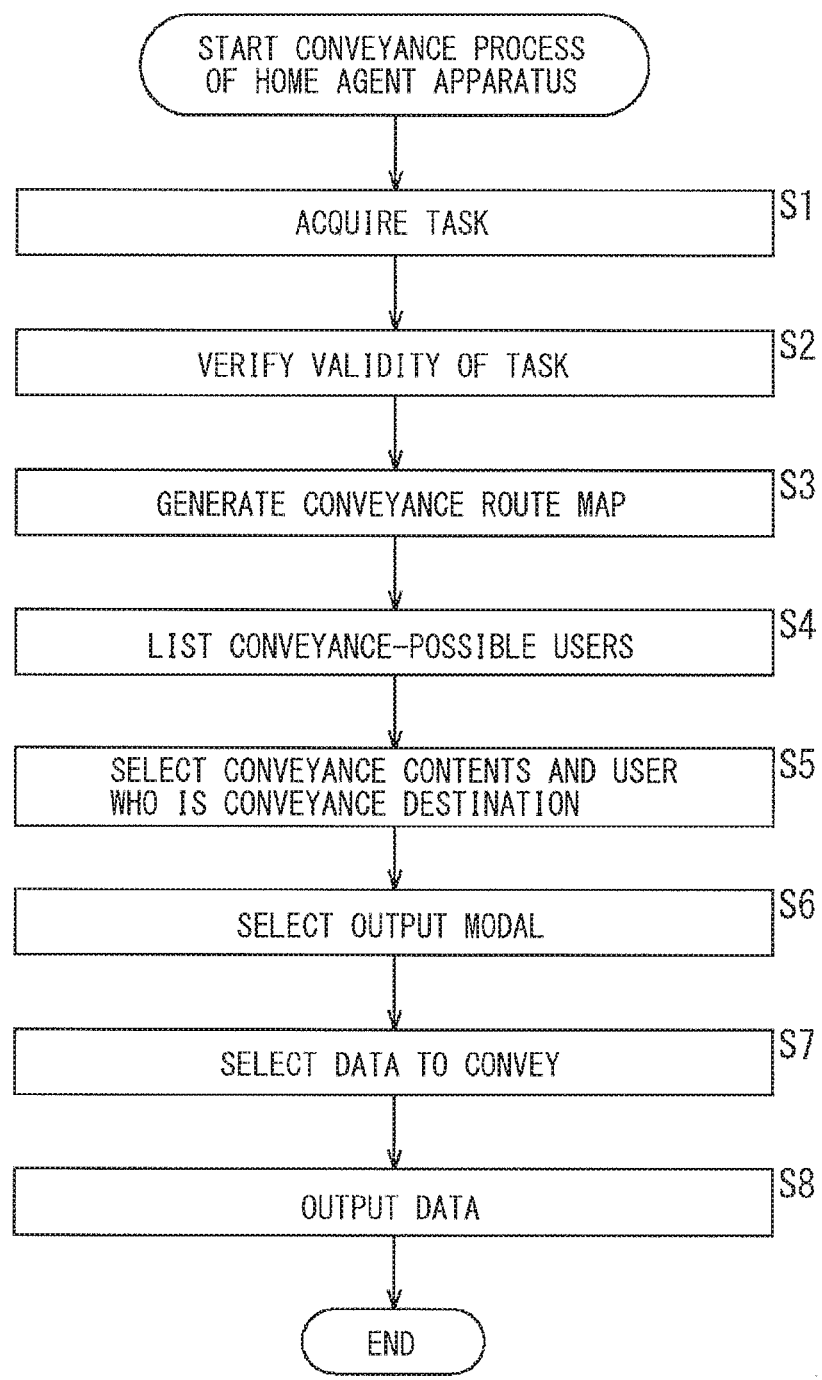

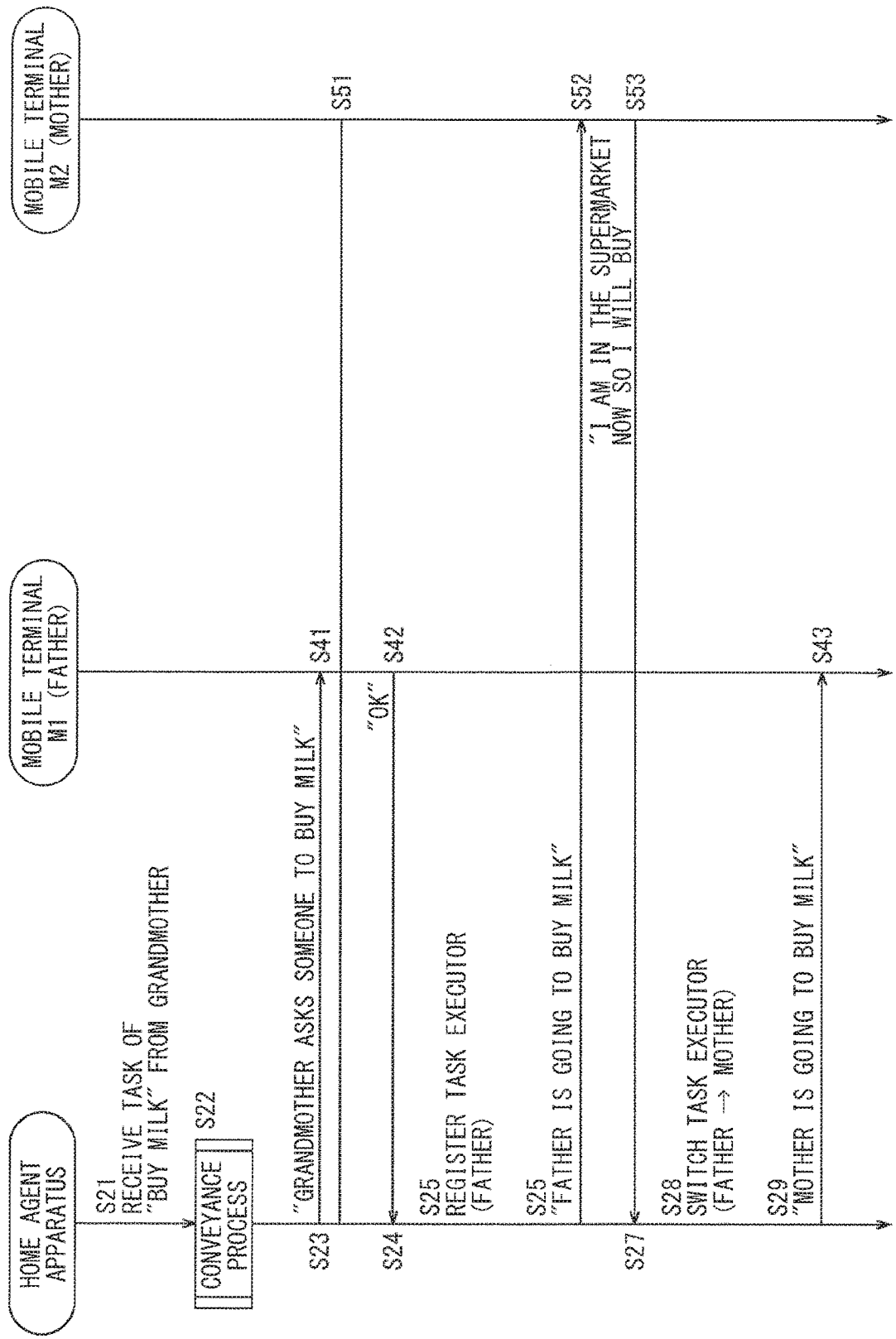

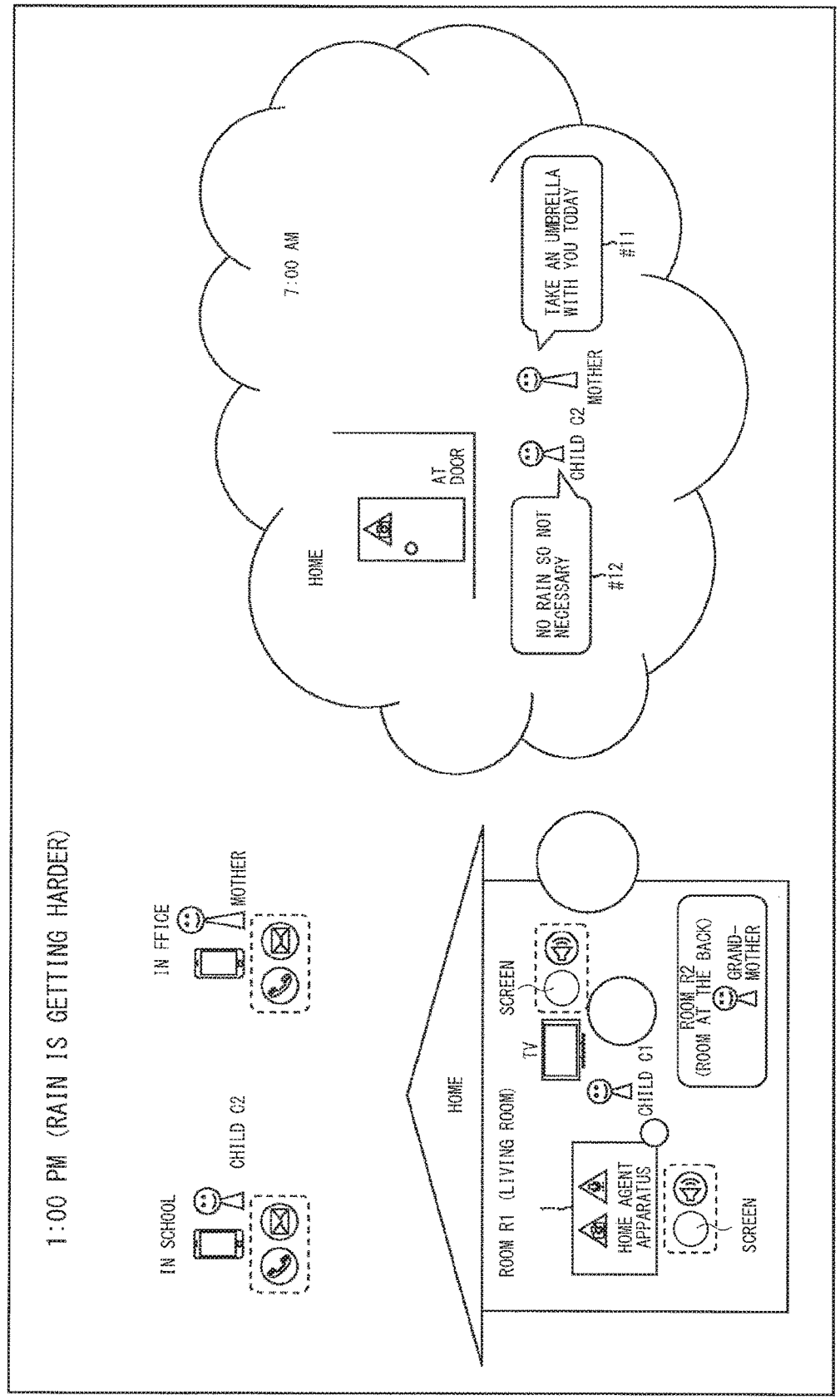
[FIG. 9]

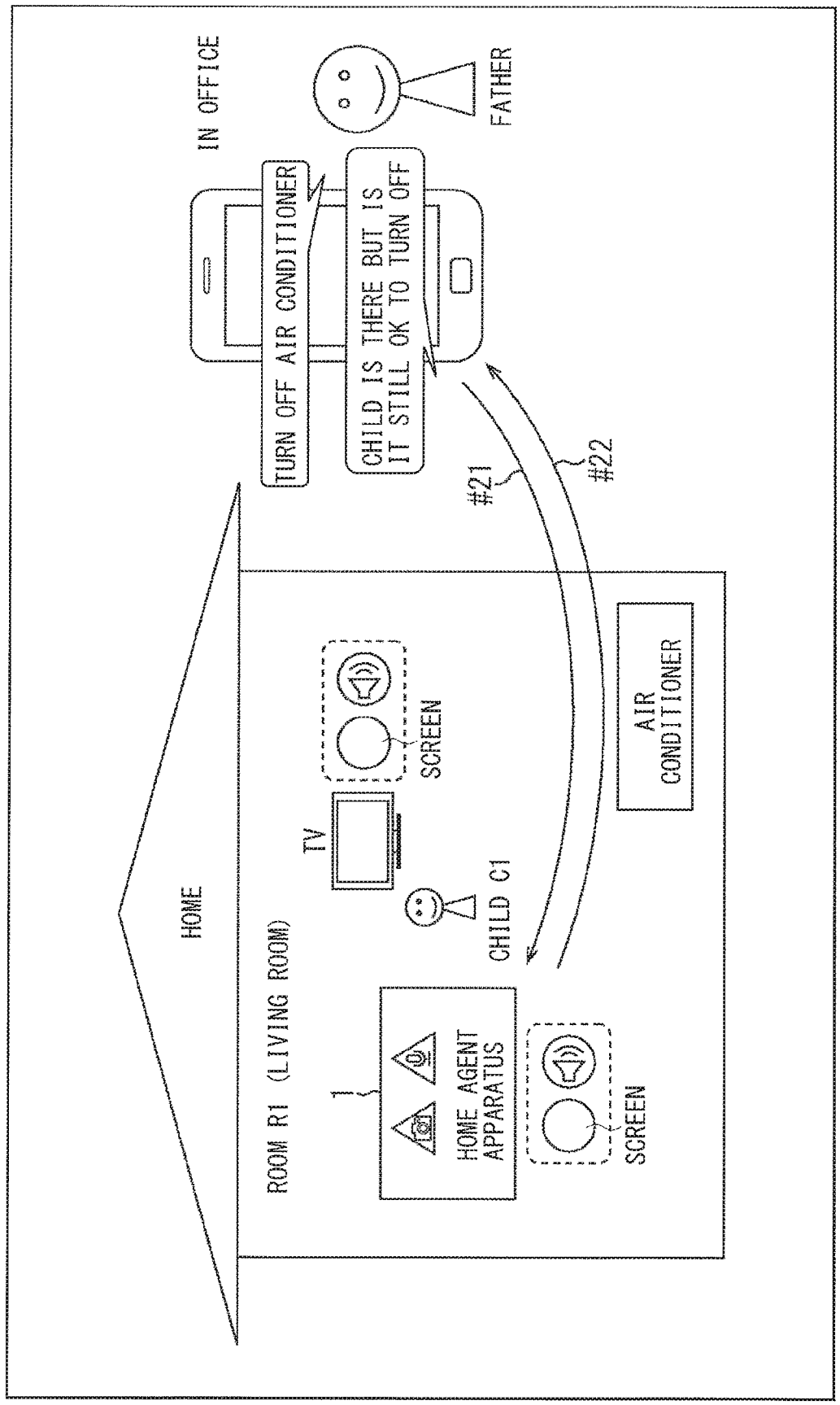

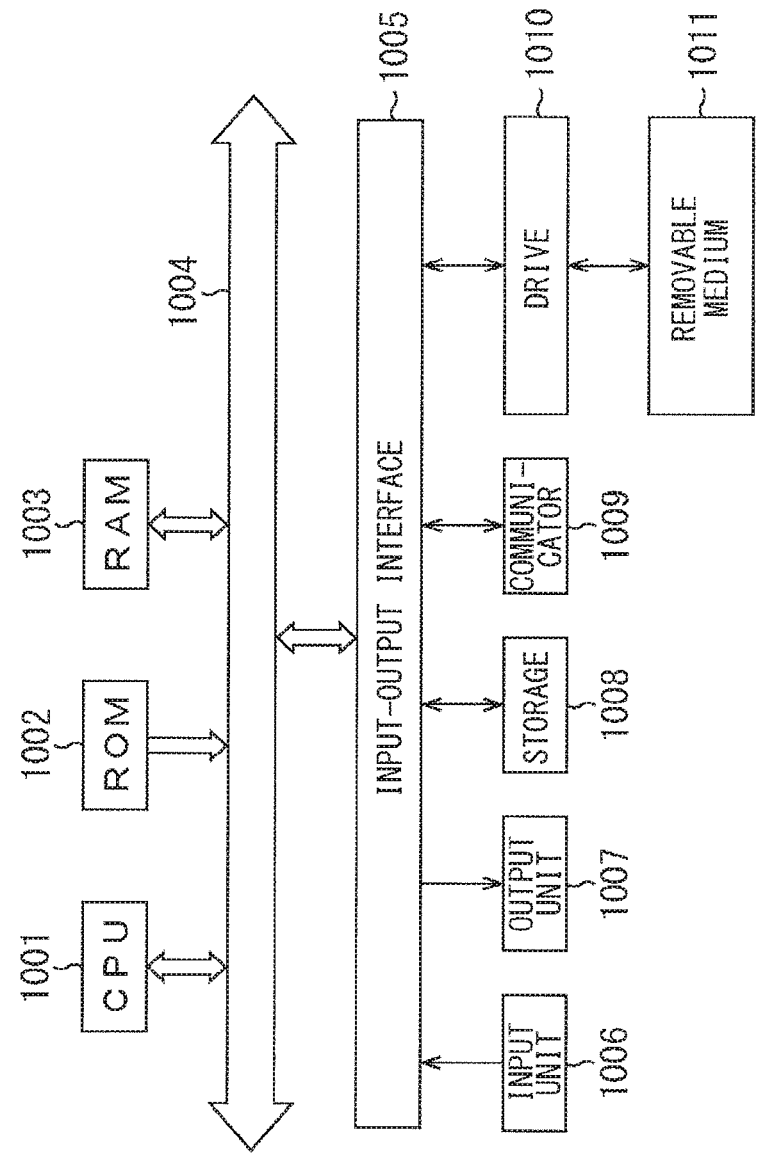
[FIG. 11]

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2018/030904 filed on Aug. 22, 2018, which claims priority benefit of Japanese Patent Application No. JP 2017-169968 filed in the Japan Patent Office on Sep. 5, 2017. Each of the above-referenced applications is hereby incorporated herein by reference in its entirety.

TECHNICAL FIELD

The present technology relates to an information processor, an information processing method, and a program. In particular, the present technology relates to an information processor, an information processing method, and a program that are able to convey information with a higher reliability.

BACKGROUND ART

There is a technology that determines, in response to a request for shopping, efficient shopping in terms of who in a group, when, and where, on the basis of schedules of members, etc., sets order of priority, and performs communication to mobile phones owned by the members in the group by e-mail.

CITATION LIST

Patent Literature

PTL 1: Japanese Unexamined Patent Application Publication No. 2008-186107

SUMMARY OF THE INVENTION

Problems to be Solved by the Invention

Simply sending a notification to a device such as a mobile phone may not be sufficient to make an owner of the device aware of the notification immediately. In addition, it is not possible to send the notification to a person who has no device.

The present technology has been provided in view of such circumstances, to convey information with a higher reliability.

Means for Solving the Problems

An information processor according to an aspect of the present technology includes: a generator that generates a conveyance route as a route to a node of a conveyance destination, the conveyance route including, as transit nodes, a node of a device and a node of a person; and an output controller that outputs information that indicates a conveyance content along the conveyance route.

According to an aspect of the present technology, a conveyance route is generated as a route to a node of a conveyance destination, the conveyance route including, as transit nodes, a node of a device and a node of a person, and information that indicates a conveyance content is outputted along the conveyance route.

Effects of the Invention

According to the present technology, it is possible to convey information with a higher reliability.

It is to be noted that the effect described here is not limitative and any effect described in the present disclosure may be achieved.

BRIEF DESCRIPTION OF DRAWINGS

FIG. 1 is a diagram that illustrates a configuration example of an information conveyance system according to an embodiment of the present technology.

FIG. 2 is a diagram that illustrates an example of a conveyance route map.

FIG. 3 is a diagram that illustrates an example of update of the conveyance route map.

FIG. 4 is a block diagram that illustrates a hardware configuration example of a home agent apparatus.

FIG. 5 is a block diagram that illustrates a functional configuration example of the home agent apparatus.

FIG. 6 is a diagram that illustrates an example of task information.

FIG. 7 is a flowchart for explaining a conveyance process of the home agent apparatus.

FIG. 8 is a flowchart for explaining a series of flow regarding conveyance of a task.

FIG. 9 is a diagram for explaining an example of verification of validity.

FIG. 10 is a diagram for explaining another example of verification of validity.

FIG. 11 is a block diagram that illustrates a configuration example of a computer.

MODES FOR CARRYING OUT THE INVENTION

In the following, some embodiments of the present technology are described. The description is made in the following order.
1. Configuration of Information Conveyance System
2. Configuration Example of Home Agent Apparatus
3. Basic Operation of Home Agent Apparatus
4. Regarding Details of Functions
5. Other Example(s)

1. Configuration of Information Conveyance System

FIG. 1 is a diagram that illustrates a configuration example of an information conveyance system according to an embodiment of the present technology.

The information conveyance system includes a home agent apparatus 1, a TV, a mobile terminal M1, and a mobile terminal M2.

As illustrated in FIG. 1, the home agent apparatus 1 and the TV are apparatuses installed at home where five people, father, a mother, a grandmother, a child C1, and a child C2, live. The home agent apparatus 1 and the TV are coupled to each other through wire or wireless communication.

The mobile terminal M1 is a device owned by the father and the mobile terminal M2 is a device owned by the mother. The mobile terminals M1 and M2 are each a portable device such as a smartphone, a tablet terminal, or a wearable terminal. The mobile terminals M1 and M2 are coupled to the home agent apparatus 1 through a network such at the Internet.

In the example of FIG. 1, the child C1 and the grandmother are at home. The child C1 is in a room R1, which may be a living room, where the home agent apparatus 1 and the TV are installed, and the grandmother is in a room R2 different from the room R1.

Meanwhile, the father is working in the office and the mother and the child C2 are doing shopping in the supermarket. The mobile terminal M2, which is owned by the mother, is passed to the child C2 and used by the child C2 to play a computer game, for example.

The home agent apparatus 1 is an apparatus equipped with a so-called agent function, which performs a variety of processes for assisting an action of a user. The agent function is implemented as a computer that constitutes the home agent apparatus 1 executes a predetermined program.

When the user inputs a task to the home agent apparatus 1, the home agent apparatus 1 selects a person suitable to execute the task and conveys the task to the selected person. The task is inputted by voice conversation with the home agent apparatus 1, for example.

The task is conveyed from the home agent apparatus 1 to the person using not only an output modal of the home agent apparatus 1 but also output modals of devices.

In FIG. 1, marks surrounded by a dashed rounded-corner rectangle represent output modals (output scheme) usable by the home agent apparatus 1 for the conveyance of the task.

In other words, the home agent apparatus 1 is able to convey the task by using a screen on an own display of the home agent apparatus 1 and voice from an own speaker of the home agent apparatus 1 as the output modals.

The home agent apparatus 1 is also able to convey the task by using a screen on a display of the TV and voice from a speaker of the TV as the output modals. In a case of conveying the task by using the screen on the display of the TV, for example, the home agent apparatus 1 sends information indicating contents of the task to the TV and causes the information to appear on the display of the TV.

The home agent apparatus 1 is able to convey the task to the users of the mobile terminals M1 and M2 by using, as the output modals, a telephone function, a function to send and receive an e-mail, and a function to send and receive a message by SNS (Social Networking Service) of each of the mobile terminals M1 and M2.

For example, in a case of conveying the task by using the e-mail function (the function to send and receive an e-mail) of the mobile terminal M1, the home agent apparatus 1 generates an e-mail containing the information indicating the contents of the task and sends the e-mail to an address of the father. The mobile terminal M1 receives the e-mail sent from the home agent apparatus 1 and displays the contents. The contents of the task are thus conveyed to the father.

Meanwhile, in a case of conveying the task by using the function to send and receive a message by SNS (SNS message function) of the mobile terminal M1, the home agent apparatus 1 generates an SNS message containing the information indicating the contents of the task and sends the SNS message to an account of the father. The mobile terminal M1 receives the SNS message sent from the home agent apparatus 1 and displays the contents. The contents of the task are thus conveyed to the father.

As described above, the home agent apparatus 1 uses a variety of output modals, thereby being able to convey the task to persons near devices equipped with the output modals or users of devices equipped with the output modals.

Further, in FIG. 1, the home agent apparatus 1 also includes a camera and a microphone as input devices. The home agent apparatus 1 is able to detect environment around the home agent apparatus 1 by analyzing an image captured by the camera or sound collected by the microphone. For example, who is around the home agent apparatus 1, who is doing what, etc, are detected.

To reliably convey the information in the information conveyance system of FIG. 1, the home agent apparatus 1 generates and manages a conveyance route map including a plurality of conveyance routes for information conveyance. To allow a predetermined task such as an in-home task to be executed, it is necessary to reliably convey the information of the task to a user suitable to execute the task.

FIG. 2 is a diagram that illustrates an example of the conveyance route map.

As illustrated in FIG. 2, the conveyance route map includes nodes and edges. Each ellipse represents a node of a device and each rounded-corner rectangle represents a node of a person. A rectangle at a left corner in FIG. 2 represents a node of the home agent apparatus 1 itself. Solid arrows connecting the nodes represent the edges.

As illustrated in FIG. 2, a conveyance route #1 whose start point is the home agent apparatus 1 and conveyance destination is the father corresponds to a route whose transit node is the mobile terminal M1. The information is conveyed from the home agent apparatus 1 to the mobile terminal M1 by using at least one of the telephone function, the e-mail function, or the SNS message function. The information is conveyed from the mobile terminal M1 to the father by outputting voice or displaying a screen.

Meanwhile, a conveyance route #2 whose start point is the home agent apparatus 1 and conveyance destination is the mother corresponds to a route whose transit nodes are the mobile terminal M1 and the child C2. The information is conveyed from the home agent apparatus 1 to the mobile terminal M2, which is held by the child C2, by using the telephone function, the e-mail function, or both.

In a case of the example illustrated in FIG. 1, the mobile terminal M2 owned by the mother is passed to the child C2 near the mother as described above. The information is conveyed from the mobile terminal M2 to the child C2 by outputting voice or displaying a screen. The conveyance of information from the child C2 to the mother is performed by the child C2, who has seen an output from the mobile terminal M2, expressing the information in words.

A conveyance route #3 whose start point is the home agent apparatus 1 and conveyance destination is the grandmother corresponds to a route whose transit nodes are the speaker of the home agent apparatus 1 and the child C1. The information is conveyed from the home agent apparatus 1 to the child C1 by outputting voice from the speaker. The information may be conveyed to the child C1 using the speaker of the TV.

In the case of FIG. 1, the child C1 is alone in the room R1, which is the same space as the home agent apparatus 1 and the TV are installed as described above. The conveyance of information from the child C1 to the grandmother is performed by the child C1, who has heard the voice outputted from the speaker, going to the room R2 and expressing the information in words.

The conveyance routes managed by the home agent apparatus 1 thus each include a person as the transit node as necessary in addition to a device.

The home agent apparatus 1 generates such a conveyance route map in real time on the basis of information acquired through own input devices of the home agent apparatus 1 or information acquired from the devices and manages the conveyance route map.

The conveyance of the task through such a conveyance route including a person as the transit node makes the task more achievable.

For example, in a case of conveying the task to the grandmother in the situation of FIG. 1, the grandmother has no mobile terminal and thus it is not possible to directly convey the task from the home agent apparatus 1 to the grandmother. In a case where the child C1 is near the home agent apparatus 1, the child C1, that is, a person, may be used as an intermediary, thereby making it possible to convey the task to the grandmother in the room R2.

Meanwhile, in a case where the child C1 is small (young) but sentences are displayed by using the screen as an output modal, the conveyance of the task is unlikely to be correctly mediated. By using voice representing simple words to convey the information to the child C1, it is possible to correctly mediate the conveyance of the task.

In a case where a device corresponding to a transit node has a plurality of output modals, the output modal to use is selected on the basis of attributes such as an age, or a situation such as a location of a person targeted for output. The output modal may be selected on the basis of the attributes, the situation, or both.

For example, in a case where an e-mail and a speaker are available as output modals and a person targeted for output is a young child with an age below a reference age, voice from the speaker is used. Meanwhile, in a case where a person targeted for output is an adult and in a bus or an office, the e-mail function is used.

In the information conveyance system of FIG. 1, the conveyance is performed via a person as described above, thereby making it possible to convey the task to a person corresponding to the conveyance destination with a higher reliability. With an increase in a conveyability of the task, it is possible to increase the achievability of the task.

It is to be noted that the conveyance route map used for selecting the conveyance route is dynamically updated in accordance with a change in the situation such as movement of a person corresponding to a transit node.

FIG. 3 is a diagram that illustrates an example of update of the conveyance route map.

For example, in a case where the child C2 returns the mobile terminal M2 to the mother and the home agent apparatus 1 detects the return, the conveyance route #2 whose conveyance destination is the mother is updated to a route whose transit node is the mobile terminal M1.

Similarly, in a case where the grandmother moves to the room R1 and the home agent apparatus 1 detects the movement, the conveyance route #3 whose conveyance destination is the grandmother is updated to a route whose transit node is the speaker. At this time, a conveyance route #4 whose conveyance destination is the child C1 is newly generated. The conveyance route #4 is a route whose transit node is the speaker.

Updating the conveyance route map in real time makes it possible for the home agent apparatus 1 to select the conveyance route suitable for the current situation to convey the task.

A series of processes being performed by the home agent apparatus 1 will be described later.

2. Configuration Example of Home Agent Apparatus

FIG. 4 is a block diagram that illustrates a hardware configuration example of the home agent apparatus 1.

A CPU (Central Processing Unit) 51, a ROM (Read Only Memory) 52, and a RAM (Random Access Memory) 53 are mutually coupled through a bus 54.

The bus 54 is coupled to a microphone 55, a camera 56, a sensor 57, a speaker 58, a display 59, an operation unit 60, a storage 61, and a communicator 62.

The microphone 55 detects sounds in the space where the home agent apparatus 1 is installed, such as speech voice of the user and environmental sound.

The camera 56 captures an image of environment around the home agent apparatus 1.

The microphone 55 and the camera 56 serve as the input devices provided to the home agent apparatus 1 itself.

The sensor 57 includes any sensor such as a human detecting sensor, a temperature sensor, or a positioning sensor. The sensor 57 outputs sensor data obtained by performing measurement.

The speaker 58 outputs voice obtained by performing TTS (Text To Speech), for example.

The display 59 includes an LCD, an organic EL display, or the like.

Output of voice using the speaker 58 and display of a screen using the display 59 serve as own output modals of the home agent apparatus 1.

The operation unit 60 includes a touch panel placed on the display 59 and a variety of buttons provided on a housing of the home agent apparatus 1. The operation unit 60 detects an operation by the user and outputs information indicating contents of the operation.

The storage 61 includes a memory such as a nonvolatile memory. The storage 61 stores a program executed by the CPU 51 and various pieces of data such as data for voice synthesis.

The communicator 62 includes a network interface, etc. The communicator 62 communicates with an external device through a network such as the Internet.

FIG. 5 is a block diagram that illustrates a functional configuration example of the home agent apparatus 1.

At least some functional units illustrated in FIG. 5 are implemented by the CPU 51 in FIG. 4 executing a predetermined program. In the home agent apparatus 1, an input detector 101, an information manager 102, a location predictor 103, a conveyance route map generator 104, a task manager 105, a task execution planner 106, a monitor 107, and an output controller 108 are implemented.

The input detector 101 acquires information supplied from each of the microphone 55, the camera 56, the sensor 57, and the operation unit 60. The input detector 101 also acquires information sent from an external device and received by the communicator 62. Various pieces of data including image data, voice data, text data, and sensor data are acquired by the input detector 101.

The input detector 101 converts the acquired information to information in an interpretable form in the input detector 101 and outputs the information to the corresponding unit.

The input detector 101 includes an image analyzer 121, a voice analyzer 122, a text data analyzer 123, and a log manager 124.

The image analyzer 121 analyzes an image captured by the camera 56 and identifies a user near the home agent apparatus 1. The image analyzer 121 outputs information regarding the identified user to the location predictor 103.

The voice analyzer 122 analyzes contents of a speech on the basis of voice detected by the microphone 55. In a case where a speech regarding a task is provided, the voice analyzer 122 outputs information indicating speech contents to the task manager 105.

The text data analyzer 123 analyzes text data contained in an e-mail or an SNS message sent from an external device and received by the communicator 62. In a case where text data regarding a task is received, the text data analyzer 123 outputs information indicating contents of the text data to the task manager 105.

The log manager 124 manages logs of results of analysis performed by the image analyzer 121, the voice analyzer 122, and the text data analyzer 123. The log manager 124 also manages a log of sensor data detected by the sensor 57, etc.

The information manager 102 manages device information, that is, information where a device is associated with a user who is an owner. For example, the owner of the mobile terminal M1 is the father and the owner of the mobile terminal M2 is the mother, which is managed on the basis of the information sent from each mobile terminal.

The device information also includes information indicating a current user of each device. For example, the mobile terminal M2 is passed to the child C2 from the mother and the child C2 is using the mobile terminal M2, which is managed on the basis that the mobile terminal M2 analyzes an image captured by the camera of the mobile terminal M2, detecting that the mobile terminal M2 is being used by the child C2. The mobile terminal M2 sends information indicating that the mobile terminal M2 is being used by the child C2 to the home agent apparatus 1.

The device information managed by the information manager 102 is dynamically updated on the basis of information sent from each device, etc. The device information is referred to by the location predictor 103 and the conveyance route map generator 104.

The location predictor 103 predicts a location of each user on the basis of the information supplied from the image analyzer 121 and the information sent from each device. For example, the location predictor 103 predicts respective locations of pre-registered family and a user having been registered as an owner of the device in the device information.

For example, the location predictor 103 predicts that the location of the user in the image captured by the camera 56 is a location near the home agent apparatus 1. The location of each user may also be predicted on the basis of an image captured by a camera installed in each room in the home. In addition, the location predictor 103 predicts the location of the user on the basis of mobile terminal location information sent from a mobile terminal and acquired by the input detector 101. Each mobile terminal has a positioning function using a GPS (Global Positioning System), or the like.

In a case where a location of the user for each time period of day is registered in a schedule of each user acquired by the input detector 101, the location predictor 103 predicts the location of the user on the basis of the schedule. It is thus possible to predict the location in a variety of methods. The location predictor 103 outputs information indicating the predicted location of each user to the conveyance route map generator 104 and the task manager 105.

The conveyance route map generator 104 generates the conveyance route map on the basis of the device information managed by the information manager 102 and the location of each user predicted by the location predictor 103. The conveyance route map contains information regarding a plurality of conveyance routes whose start points are the home agent apparatus 1 and conveyance destinations are the respective users.

For example, the conveyance route map generator 104 sets the conveyance routes by connecting a node of a device and a node of an owner of the device by an edge. Such setting of the conveyance routes is performed on the basis of the device information.

In addition, the conveyance route map generator 104 sets the conveyance routes by connecting nodes of nearby users by an edge. Such setting of the conveyance routes is performed on the basis of the location of each user.

In addition, the conveyance route map generator 104 sets property information in each of the edges between the nodes. The property information includes information regarding reliability, conveyability, conveyance speed, and limitation.

The reliability refers to accuracy of the information to be conveyed. The conveyability refers to possibility of actually achieving information conveyance. The conveyance speed refers to time to be spent for information conveyance from one of the nodes to another node.

The limitation is set in accordance with a wish of a requester of the task. For example, when the requester of the task enters a condition indicating that the requester does not wish to convey the task to a specific person, the conveyance route that passes through the node corresponding to the specific person is not selected.

The conveyance route map generator 104 dynamically updates the conveyance route map on the basis of the information supplied from each of the information manager 102 and the location predictor 103. The conveyance route map generator 104 outputs information regarding the latest conveyance route map to the task execution planner 106.

After the generation of the conveyance route map, an information conveyance test may be performed to confirm the reliability of each of the conveyance routes. For example, in a case where there are two or more conveyance routes that lead to a conveyance destination, information conveyance is performed with each of such conveyance routes for testing purpose and the conveyance route map is modified on the basis of a result. Moreover, a speech for test is made to the user near the home agent apparatus 1 and the conveyance route map is modified on the basis of a result.

The task manager 105 manages task information, that is, detailed information regarding the task, and task status information indicating a status of the task. The task manager 105 includes a memory for storing those pieces of information.

FIG. 6 is a diagram that illustrates an example of the task information.

As illustrated in FIG. 6, the task information is information in which each task is associated with a requester, possible executor(s), a deadline, an urgency level, and a difficulty level.

In the example of FIG. 6, a first task is "buy milk". The requester of the task is the grandmother, the possible executors are the father and the mother. The deadline is by 18:30 and the urgency level is 5. The difficulty level is 1.

The task of "buy milk" is identified by analyzing voice of the grandmother, for example. In response to detecting the input of the task of "buy milk", the voice analyzer 122 outputs information indicating contents of the task to the task manager 105.

It is identified that the requester is the grandmother by identifying a speaker, for example. The voice analyzer 122 has information indicating a feature of voice of each user. In response to detecting that the user who has inputted the task is the grandmother, the voice analyzer 122 outputs information indicating that the requester is the grandmother to the task manager 105.

The father and the mother are set as the possible executors on the basis of situations of the father and the mother, such as the father and the mother each being near a store that sells milk. A location of each of the father and mother is predicted by the location predictor 103. Meanwhile, a location of the store is identified on the basis of map data sent from a server (not illustrated) or the like and acquired by the input detector 101. Such selection of the possible executor(s) based on the situation of each user is performed by the task execution planner 106, for example.

The deadline is identified as by 18:30 by analyzing the voice of the grandmother. For example, in response to the input of the task, the home agent apparatus 1 inquires the requester of the task by voice about when the deadline is. The deadline of the task is set on the basis of a response to the inquiry.

The urgency level and the difficulty level are set in accordance with task type, for example. The urgency level and the difficulty level may be inputted by the requester of the task.

In the example of FIG. 6, a second task is "deliver lunch box to school" and a third task is "bundle old newspapers". In addition, a fourth task is "go to school for pick up". For each task, the requester, the possible executor(s), the deadline, the urgency level, and the difficulty level are set in the same manner as for the first task.

The task manager 105 manages the task information including such pieces of information. The task status information, which is managed by the task manager 105 together with the task information, contains a value representing achievability of each task.

The task manager 105 also holds a history regarding contents of the task, the requester, and the executor. The history managed by the task manager 105 is also used to select the possible executor(s) or the conveyance route if necessary.

The task manager 105 performs task validity verification. The task validity verification will be described later.

The task execution planner 106 determines a system behavior on the basis of the information managed by the task manager 105 and the conveyance route map generated by the conveyance route map generator 104.

For example, in a case where the above task of "buy milk" is inputted, the task execution planner 106 selects the father and the mother as the possible executors. In addition, the task execution planner 106 selects, from among the conveyance routes included in the conveyance route map, the conveyance route whose conveyance destination is the father, who is a possible executor, and the conveyance destination whose conveyance destination is the mother, who is also a possible executor.

The task execution planner 106 generates text data indicating conveyance contents, such as "the grandmother asks someone to buy milk". The task execution planner 106 selects the mobile terminal M1 owned by the father and the mobile terminal M2 held by the child C2 near the mother as output devices, and selects the respective e-mail functions of the respective mobile terminals as the output modals.

The task execution planner 106 thus functions as a controller that plans an approach for executing the task by selecting the possible executor(s), selecting the conveyance route(s), generating the data indicating the conveyance contents, selecting the output device(s), selecting the output modal(s), etc. The task execution planner 106 outputs information indicating planned contents to the output controller 108.

The monitor 107 monitors the achievability of the task. The monitor 107 determines whether or not it is necessary to change a plan for executing the task on the basis of a value managed as the task status information by the task manager 105.

If determining that it is necessary to change the plan, since the value is lower than a threshold and the task is less achievable, for example, the monitor 107 outputs information indicating the determination to the task manager 105. The task manager 105 instructs the task execution planner 106 to change the plan, and the task execution planner 106 changes the plan by changing the possible executor(s), etc.

The output controller 108 controls an output for conveying the contents of the task in accordance with the plan provided by the task execution planner 106. In other words, the output controller 108 outputs the contents of the task by controlling the speaker 58 and the display 59, which are the output devices of the home agent apparatus 1. In addition, the output controller 108 controls the communicator 62, sending the information indicating the contents of the task to the external device.

In the above example, the output controller 108 generates an e-mail containing text data indicating "the grandmother asks someone to buy milk" on the basis of the information supplied from the task execution planner 106, and sends the e-mail to each of the mobile terminal M1 and the mobile terminal M2. In a case where the telephone function is selected as the output modal for the task instead of the e-mail, the output controller 108 calls on the mobile terminals and causes the mobile terminals to output synthesized voice saying that "the grandmother asks someone to buy milk".

3. Basic Operation of Home Agent Apparatus

With reference to a flowchart of FIG. 7, a conveyance process of the home agent apparatus 1 will be described.

The process of FIG. 7 is performed when the task is inputted by a predetermined user, for example. The voice analyzer 122 analyzes the voice of the user and outputs information regarding the task to the task manager 105.

In Step S1, the task manager 105 acquires the task on the basis of the information supplied from the input detector 101. The task manager 105 sets task information containing pieces of information regarding the acquired task. Here, for example, the pieces of information except the possible executor(s) are set.

In Step S2, the task manager 105 verifies a validity of executing the task as described later. Subsequent processes are to be performed for a task determined to be valid to execute.

In Step S3, the conveyance route map generator 104 generates the conveyance route map on the basis of the device information managed by the information manager 102 and the location of each user predicted by the location predictor 103.

In Step S4, the task execution planner 106 lists users to whom the task is able to be conveyed from among the users set as the nodes of conveyance destinations in the conveyance route map.

For example, any user in a situation of not being able to execute the task, such as being at work or attending a class at school, is excluded from users to be listed. The situation of each user is identified on the basis of information sent from the mobile terminal carried by the user, etc.

In Step S5, the task execution planner 106 selects conveyance contents, and also selects the user (possible executor) corresponding to the conveyance destination from the users on the list in accordance with the conveyance contents.

The conveyance route is also selected in accordance with the user corresponding to the conveyance destination.

In a case where a shopping task such as "buy milk" is inputted by the grandmother and the contents of the task are determined to be conveyed, the child C1 and the child C2 are excluded from the possible executors. For example, information regarding conditions for selecting the possible executor in accordance with task type is set in the task execution planner 106.

The task execution planner 106 outputs information regarding the user selected as the possible executor to the task manager 105. In the task manager 105, the information regarding the possible executor selected by the task execution planner 106 is set in the task information.

In Step S6, the task execution planner 106 selects the output modal. The output modal is selected on the basis of who is the possible executor, the situation of the user corresponding to the possible executor, etc.

For example, in a case where the task is to be conveyed to the mother, who is the possible executor, the task execution planner 106 identifies that the mobile terminal M2 is set as the transit node on the conveyance route whose conveyance destination is the mother, and selects a predetermined output modal of the mobile terminal M2.

In Step S7, the task execution planner 106 determines data to convey in accordance with the output modal. In a case of selecting the e-mail function as the output modal, the task execution planner 106 generates text data indicating "the grandmother asks someone to buy milk", which is to be contained in an e-mail.

In Step S8, the output controller 108 outputs the data generated by the task execution planner 106, thereby conveying the task to the possible executor.

In response to receiving the e-mail sent from the home agent apparatus 1, for example, the mobile terminal M2 displays the contents of the e-mail. The child C2, who is using the mobile terminal M2, sees the contents of the e-mail and tells the mother that, for example, "the grandmother asks someone to buy milk", thereby conveying the contents of the task to the mother.

It is thus possible to convey the task with a higher reliability by conveying the task through the conveyance route including the person as the transit node. By reliably conveying the task, it is possible to increase the achievability of the task.

4. Regarding Details of Functions

Description will be made on functions for increasing the achievability of the task.
<4. 1 Notification Function According to Contents of Task and Situation of User>

With reference to a flowchart of FIG. 8, a series of flow for task conveyance will be described.

The description will be made on communication among the home agent apparatus 1, the owner of the mobile terminal M1, namely, the father, and the owner of the mobile terminal M2, namely, the mother, in the above case where the task of "buy milk" is inputted by the grandmother.

For example, when the grandmother says that "please buy milk", the home agent apparatus 1 receives the task inputted by the grandmother in Step S21. The voice analyzer 122 of the input detector 101 analyzes the voice and outputs the information of the task of "buy milk" to the task manager 105.

In Step S22, the home agent apparatus 1 performs the conveyance process described with reference to FIG. 7. In a case where the father is in the office and the mother is in the supermarket together with the child C2 as illustrated in FIG. 1, the task of "buy milk" is conveyed to the father and the mother by the conveyance process.

In Step S23, the output controller 108 of the home agent apparatus 1 sends an e-mail containing the text data indicating "the grandmother asks someone to buy milk" to each of the mobile terminal M1 and the mobile terminal M2.

The e-mail sent from the home agent apparatus 1 is received by the mobile terminal M1 in Step S41. The father sees the contents of the e-mail by operating the mobile terminal M1.

Similarly, the e-mail sent from the home agent apparatus 1 is received by the mobile terminal M2 in Step S51. The child C2, who is using the mobile terminal M2, sees the contents of the e-mail and talks to the mother, thereby conveying the contents of the task.

It is assumed that the father, who has seen the contents of the task, generates an e-mail containing text data indicating "OK" and performs an operation to reply to the request for the task. In this case, the mobile terminal M1 sends the e-mail replying to the request for the task to the home agent apparatus 1 in Step S42.

In Step S24, the home agent apparatus 1 receives the e-mail sent from the mobile terminal M1. The text data analyzer 123 of the home agent apparatus 1 analyzes the text data contained in the e-mail and outputs information indicating that the request for the task is accepted by the father to the task manager 105.

In Step S25, the task manager 105 registers the father as the possible executor of the task. In response to the registration of the possible executor, the task execution planner 106 generates text data indicating "the father is going to buy milk" and outputs the text data to the output controller 108.

In Step S26, the output controller 108 sends an e-mail containing the text data indicating "the father is going to buy milk" to the mobile terminal M2. The e-mail sent here is intended to notify the mother that the father has been selected as the possible executor of the task.

In Step S52, the mobile terminal M2 receives and displays the e-mail sent from the home agent apparatus 1. When the father executes the task of "buy milk", the series of processes ends.

Here, it is assumed that the mother, who has seen the contents of the e-mail, generates an e-mail containing text data indicating "I am in the supermarket now so I will buy" and performs an operation to send the e-mail to the home agent apparatus 1. In Step S53, the mobile terminal M2 sends the e-mail generated by the mother to the home agent apparatus 1.

In Step S27, the home agent apparatus 1 receives the e-mail sent from the mobile terminal M2. The text data analyzer 123 of the home agent apparatus 1 analyzes the text data contained in the e-mail and outputs information indicating that the mother is going to execute the task to the task manager 105.

In Step S28, the task manager 105 determines that the mother, who is in the supermarket, is suitable to execute the task on the basis of the location of each user predicted by the location predictor 103, and switches the possible executor of the task to the mother. The task manager 105 registers the mother as the possible executor in the task information in place of the father. In response to the switching of the possible executor, the task execution planner 106 generates text data indicating "the mother is going to buy milk" and outputs the text data to the output controller 108.

In Step S29, the output controller 108 sends an e-mail containing the text data indicating "the mother is going to buy milk" to the mobile terminal M1.

In Step S43, the mobile terminal M1 receives and displays the e-mail sent from the home agent apparatus 1. When the mother executes the task of "buy milk", the series of processes ends.

The information conveyance is thus performed by the home agent apparatus 1 as appropriate in accordance with status of the task, situation of the user, etc.

For example, it is assumed that after the e-mail regarding the request for the task is sent to each of the mobile terminal M1 and the mobile terminal M2 in Step S23, the father and the mother are both approaching the home without replying. In a case where the achievability of the task is reduced as the two possible executors are approaching the home without executing the task, the information conveyance is performed with a change in the plan as described later. It is to be noted that the locations of two of the father and the mother are predicted by the location predictor 103.

In addition, in a case where the achievability of the task is reduced and a notification of the reduction in the achievability is to be made to the grandmother, that is, the requester of the task, the task execution planner 106 generates text data indicating "go and get the grandmother" and outputs the text data to the output controller 108.

The output controller 108 performs voice synthesis on the basis of the text data generated by the task execution planner 106, thereby outputting voice saying "go and get the grandmother" through the speaker 58 to talk to the child C1. As described above with reference to FIG. 2, since the grandmother has no mobile terminal, the child C1 is set as the transit node in a case where the grandmother is the conveyance destination.

Hearing the call from the home agent apparatus 1, the child C1 goes and gets the grandmother in the room R2. In response to detecting that the grandmother comes near the home agent apparatus 1 on the basis of a result of analysis of an image captured by the camera 56, the task execution planner 106 causes the output controller 108 to output predetermined synthesized voice, thereby informing the grandmother that the task is difficult to execute.

Although the complicated communication is necessary for executing the task, the home agent apparatus 1 is thus able to achieve such communication in accordance with the status of the task and the situation of the user.

<4. 2 Function to Change Plan in a Case where Task is Difficult to Achieve>

The user selected as the possible executor of the task may not be able to execute the task for any reason.

Moreover, it may be determined, on the basis of the data, that the user selected as the possible executor of the task is in a situation where it is difficult to execute the task. For example, if the possible executor of the task nearly arrives at home without executing the task outside, it is determined that the possible executor of the task is in a situation where it is difficult to execute the task.

The task manager 105 manages the task status information, which indicates the achievability of each task, on the basis of the information sent from the mobile terminal of the user, for example. In this example, the task manager 105 reduces a value representing the achievability of the task as the user goes farther from a place where it is possible to execute the task.

The monitor 107 monitors the task status information and outputs, in a case where the value representing the achievability of the task is reduced below a threshold, information indicating the reduction to the task manager 105. In a case of receiving a notification indicating that the value representing the achievability of the task is lower than the threshold from the monitor 107, the task manager 105 instructs the task execution planner 106 to change the plan for executing the task.

The task execution planner 106 changes the plan for executing the task by switching the possible executor to another user, or the like. In a case where the possible executor is switched, the conveyance route whose conveyance destination is the possible executor having been switched to is selected, and the contents of the task is conveyed.

It is thus possible to increase a possibility of achieving the task by changing the plan if the task is less achievable.

In response to a situation where the task is less achievable, a reminder notification may be sent to the possible executor of the task. Moreover, a notification of a situation where the task is less achievable may be sent to the requester of the task. These notifications are also provided by the output controller 108 on the basis of the information outputted from the task execution planner 106.

<4. 3 Function to Verify Validity of Task>

Description will be made on a function of the task manager 105 to verify the validity of executing the task.

(1) Function to Actively Disambiguate Conditions for Execution of Task

A task provided with conditions for execution, such as "pick up the child from the elementary school if the child does not have an umbrella with him or her", may be inputted. In this case, the conditions for execution of the task of "pick up the child from the elementary school" are "if the child does not have an umbrella with him or her".

In a case where such a task with conditions is inputted, the task manager 105 determines that it is valid to execute the task if the conditions are satisfied, and performs a process for conveying the contents of the task.

Meanwhile, there may be a case where it is not possible to determine whether or not the conditions are satisfied, for example, when it is not certain whether the child has an umbrella with him or her. In this case, it is determined whether or not the execution of the task is valid on the basis of a possibility that the conditions are satisfied.

The task manager 105 calculates the possibility that the conditions are satisfied and determines that the execution of the task is valid if the calculated possibility is higher than a threshold. Meanwhile, the task manager 105 determines that the execution of the task is not valid if the possibility that the conditions are satisfied is less than the threshold. The possibility that the conditions are satisfied is calculated on the basis of various pieces of information.

It may thus be determined whether or not the execution of the task is valid on the basis of the possibility that the conditions are satisfied.

FIG. 9 is a diagram that illustrates an example of the verification of the validity.

With reference to FIG. 9, description will be made on an example where the mother in the office inputs a task of "pick up the child from the elementary school if the child does not have an umbrella with him or her". The task is inputted by, for example, operating the own mobile terminal M2 by the mother, sending an e-mail containing information indicating the contents of such a task to the home agent apparatus 1. In the home agent apparatus 1, the verification of the validity is performed in response to the input of the task (Step S2 in FIG. 7).

A situation in the home illustrated in FIG. 9 is the same as the situation described with reference to FIG. 1. The child C1 is in the room R1 where the home agent apparatus 1 is installed and the grandmother is in the different room R2. The child C2 is in the school. The child to be picked up as a result of executing the task is the child C2. In addition, the current time is 1 p.m.

In a case where the mother recommends the child C2 to take an umbrella with him or her and the child C2 says no in response during conversation between the mother and the child C2 at 7 a.m. as indicated by balloons #11 and #12 in FIG. 9, information indicating such a communication is recorded in the log manager 124.

For example, the image analyzer 121 of the home agent apparatus 1 detects that the mother and the child C2 are having the conversation at the door by analyzing an image captured by a camera installed at the door and causes the log manager 124 to record the conversation. Moreover, the voice analyzer 122 detects contents of the conversation between the mother and the child C2 by analyzing voice detected by a microphone installed at the door and causes the log manager 124 to record the contents.

At the present time, 1 p.m., the task manager 105 calculates that a possibility that the child C2 has an umbrella with him or her is a low possibility on the basis of the information recorded in the log manager 124. The task manager 105 determines that the execution of the task is valid on the basis of the calculated possibility being less than the threshold, and performs a process for executing the task.

That is, the task manager 105 sets task information regarding the task of "go to school for pick up" as illustrated as a fourth task in FIG. 6.

The task execution planner 106 selects the grandmother as the user to which the task is to be conveyed on the basis of the conveyance route map generated by the conveyance route map generator 104. The grandmother is set as the possible executor of the task.

The task execution planner 106 plans to convey the task to the grandmother via the nearby child C1 on the basis of the conveyance route map. The task execution planner 106 also generates text data indicating the contents of the task and outputs the text data to the output controller 108 to output voice from the speaker 58 of the home agent apparatus 1.

The output controller 108 causes, for example, voice saying "please tell the grandmother to go to school for pick up" or the like to be outputted from the speaker 58, thereby asking the child C1 to convey the task. Hearing the voice outputted from the speaker 58, the child C1 goes to the room R2 and conveys the contents of the task to the grandmother.

After the contents of the task are conveyed and the execution of the task is started, the monitor 107 starts monitoring a status of achievement of the task. It is identified that the grandmother has started executing the task by, for example, analyzing the voice of the grandmother, such as "OK".

Thus, the past situation may be estimated on the basis of various pieces of information, and the validity of executing the task may be determined on the basis of the past situation.

The user who is the possible executor may be notified of the possibility that the conditions are satisfied, and a final decision on whether or not the task is to be executed may be left to the user.

In addition, in a case where it is not possible to determine whether or not the conditions are satisfied, whether or not the task is to be executed may be determined in accordance with the urgency level of the task. For example, for a task with an urgency level higher than a threshold, the process for conveying the contents of the task may be performed even when it is not possible to determine whether or not the conditions are satisfied.

(2) Function to Determine Validity of Task on the Basis of Knowledge

The validity of executing the task may be determined on the basis of knowledge set in the home agent apparatus 1. In this case, information regarding the conditions for each task and confirmation contents are set in advance as information corresponding to a criterion for determination in the task manager 105.

FIG. 10 is a diagram that illustrates another example of the verification of the validity.

Here, description will be made on an example where the father, who is in the office, turns off an operation of an air conditioner installed in the room R1 in the home. The home agent apparatus 1 is able to control the operation of the air conditioner by a signal outputted from the output controller 108, for example.

As indicated by an arrow #21 in FIG. 10, the father operates the own mobile terminal M1, sending an e-mail containing information indicating a task of "turn off the air conditioner" to the home agent apparatus 1. In this case, the task manager 105 verifies the validity of executing the task inputted by the father.

If the child C1 is watching TV in the room R1, the task manager 105 determines that the operation of the air conditioner should not be turned off on the basis of the knowledge. It is identified that the child C1 is in the room R1 on the basis of a result of analysis of an image captured by the camera 56.

In this case, the output controller 108 sends an e-mail containing text data indicating "the child is there but is it still OK to turn off" or the like to the mobile terminal M1 of the father in accordance with the control by the task manager 105 or the like as indicated by an arrow #22.

Seeing the contents of the e-mail, the father sends a reply indicating that "it is not necessary to turn off, if so" or the like to the home agent apparatus 1.

It is thus possible to verify, on the basis of information set in advance for each task, the validity of executing the task. In the example of FIG. 10, for the task of "turn off the air conditioner", the following are set: information regarding conditions of whether or not any child is there; and information regarding confirmation contents indicating the confirmation to the requester whether or not the task is to be executed if the conditions are satisfied.

The information regarding the knowledge for each task may be provided to the home agent apparatus 1 from a server (not illustrated) or may be inputted by the user.

<4. 4 Function to Set Executor of Task>

The requester may be allowed to designate the executor of the task.

For example, in a case of executing a task of "buy the children presents", it is preferable for the requester to exclude the children from the possible executors of the task so as not to let the children know. Moreover, for some tasks, the requester is desired to designate the executor.

The task manager 105 manages the list of the possible executors of the task as a white list and a list of persons to whom the requester does not wish to request for the task as a black list.

In a case where the person designated as the executor of the task by the requester is registered in the while list, the task manager 105 conveys the contents of the task to this person. Meanwhile, in a case where a person designated as the executor of the task by the requester is not registered in the while list, the task manager 105 conveys the contents of the task to a person not registered in the black list. The conveyance of the task to the thus-selected conveyance destination is also performed on the basis of the above conveyance route map.

Such lists make it possible to select the conveyance destination in accordance with the wish of the requester, that is, the task is desired to be executed by a certain person, if possible, otherwise by another person.

The requester may be allowed to designate a plurality of possible executors. In this case, the requester sets a priority of each of the possible executors.

5. Other Example(s)

Although only one conveyance route is exemplarily set for one conveyance destination, a plurality of conveyance routes may be set. Which one among the plurality of conveyance routes is to be used is selected on the basis of the property information set in the edges, for example.

As described above, the property information includes the information regarding reliability, conveyability, conveyance speed, and limitation. It is possible to select the conveyance route on the basis of at least one of reliability, conveyability, conveyance speed, or limitation in accordance with a wish of the requester. For example, in a case where the requester wishes for rapid conveyance, the conveyance route including the edge that allows the information to be rapidly conveyed on the basis of the conveyance speed in the property information.

The information conveyance function for executing the task may be provided not in a dedicated device such as the home agent apparatus 1, but in a general-purpose device such as a mobile terminal.

In addition, at least some of the configuration of the home agent apparatus 1 described with reference to FIG. 5 may be provided in a server coupled to the home agent apparatus 1 through the Internet. In this case, the above information conveyance for executing the task is achieved by the home agent apparatus 1 and the server.

Although the task is exemplarily inputted by talking to the home agent apparatus 1 or sending an e-mail to the home agent apparatus 1, the task may be inputted on the basis of a To-Do list prepared by the user. In this case, the home agent apparatus 1 acquires the To-Do list and analyzes contents, thereby setting the task.

Although the case of conveying the information regarding the task is described, the above information conveyance using the conveyance route map is applicable to a case of conveying any other information.

Configuration Example of Computer

The above series of processes may be performed by hardware or may be performed by software. In a case of executing the series of processes by software, a program that constitutes the software is installed from a program recording medium to a computer incorporated in dedicated hardware, a general-purpose computer, or the like.

FIG. 11 is a block diagram that illustrates a configuration example of hardware of a computer that executes the above series of processes by the program.

A CPU 1001, a ROM 1002, and a RAM 1003 are mutually coupled through a bus 1004.

The bus 1004 is further coupled to an input-output interface 1005. The input-output interface 1005 is coupled to an input unit 1006 including a keyboard, a mouse, or the like and an output unit 1007 including a display, a speaker, or the like. The input-output interface 1005 is also coupled to a storage 1008 including a hard disk, a non-volatile memory, or the like, a communicator 1009 including a network interface or the like, and a drive 1010 that drives a removable medium 1011.

In the thus-constituted computer, the CPU 1001 loads a program stored in the storage 1008 through the input-output interface 1005 and the bus 1004 to the RAM 1003 and executes the program, thereby performing the above series of processes, for example.

The program to be executed by the CPU 1001 is recorded in the removable medium 1011 or provided through a wired or wireless transmission medium such as local area network, the Internet, or digital broadcasting, and installed in the storage 1008, for example.

It is to be noted that the program to be executed by the computer may be a program that enables the processes to be performed in time series in line with the order described herein or a program that enables the processes to be performed in parallel or at a necessary time such as when called.

A system herein means an assembly of a plurality of components (devices, modules (parts), etc.) and all the components are not necessarily provided in the same housing. Accordingly, a plurality of devices that are housed in separate housings while coupled through a network, and one device including a plurality of modules housed in one housing are both within the scope of the system.

It is to be noted that any effect described herein is merely a non-limitative example and may include other effects.

The embodiment of the present technology is not limited to the above embodiment but may be modified in a variety of manners without departing from the spirit of the present technology.

For example, the present technology may have a configuration of cloud computing, where one function is shared and performed in cooperation by a plurality of devices through a network.

In addition, the steps described in the above flowchart may be performed by one device or, alternatively, shared by a plurality of devices.

Moreover, in a case where one step includes a plurality of processes, the plurality of processes in the one step may be performed by one device or, alternatively, shared by a plurality of devices.

Combination Examples of Configuration

The present technology may have any one of the following configurations.

(1)

An information processor including:

a generator that generates a conveyance route as a route to a node of a conveyance destination, the conveyance route including, as transit nodes, a node of a device and a node of a person; and an output controller that outputs information that indicates a conveyance content along the conveyance route.

(2)

The information processor according to (1), further including:

a task manager that manages a task inputted by a predetermined user; and a controller that selects, among a plurality of the conveyance routes, the conveyance route including, as the node of the conveyance destination, an executor of the task, in which the output controller outputs information regarding the task along the selected conveyance route.

(3)
The information processor according to (2), further including an information manager that manages information regarding the device owned by each of users,
in which the generator generates the conveyance route on a basis of the information managed by the information manager.

(4)
The information processor according to (3), further including a predictor that predicts a location of each of users,
in which the generator generates the conveyance route on a basis of a location of a user.

(5)
The information processor according to (4), in which the generator updates the conveyance route in accordance with a situation of each of users including a location that has been predicted.

(6)
The information processor according to any one of (2) to (5), in which
the task manager manages information that indicates achievability of the task on a basis of a situation of a user selected as the executor of the task, and
the controller switches the executor of the task to another user on a basis of the information that indicates the achievability and selects the conveyance route including, as the node of the conveyance destination, the executor of the task having been switched to.

(7)
The information processor according to (6), in which the controller switches the executor of the task to the other user in a case where a value that represents the achievability managed by the task manager falls below a threshold.

(8)
The information processor according to any one of (2) to (7), in which
the controller selects an output scheme in accordance with at least one of a situation or attributes of the person corresponding to the transit node, and
the output controller outputs the information that indicates the conveyance content in accordance with the output scheme that has been selected.

(9)
The information processor according to (8), in which the controller selects output by voice as the output scheme in a case where the person corresponding to the transit node is in same space as the information processor is installed.

(10)
The information processor according to (8), in which the controller selects output by voice as the output scheme in a case where the person corresponding to the transit node is younger than a predetermined age.

(11)
The information processor according to any one of (2) to (10), in which the task manager verifies validity of executing the task that has been inputted, on a basis of information regarding a past situation or on a basis of information corresponding to a criterion for determination set in advance.

(12)
The information processor according to (2) to (11), in which the task manager manages the task inputted by voice or the task inputted using text data.

(13)
An information processing method performed by an information processor, the method including:
generating a conveyance route as a route to a node of a conveyance destination, the conveyance route including, as transit nodes, a node of a device and a node of a person; and
outputting information that indicates a conveyance content along the conveyance route.

(14)
A program that enables a computer to execute a process, the process including: generating a conveyance route as a route to a node of a conveyance destination, the conveyance route including, as transit nodes, a node of a device and a node of a person; and
outputting information that indicates a conveyance content along the conveyance route.

REFERENCE SIGNS LIST 1 home agent apparatus, 101 input detector, 102 information manager, 103 location predictor, 104 conveyance route map generator, 105 task manager, 106 task execution planner, 107 monitor, 108 output controller, 121 image analyzer, 122 voice analyzer, 123 text data analyzer, 124 log manager

The invention claimed is:
1. An information processing method, comprising:
managing a task inputted by a first user of a plurality of users;
generating a plurality of conveyance routes to communicate conveyance content to a node of a conveyance destination, wherein
each of the plurality of conveyance routes comprises, as transit nodes, a node of a device and a node of a person, and
the conveyance content is associated with the task;
selecting a first conveyance route from the plurality of conveyance routes, wherein the selected first conveyance route includes, as the node of the conveyance destination, an executor of the task, wherein
the executor of the task corresponds to at least one second user of the plurality of users, and
the at least one second user is different from the first user;
outputting first information that indicates the conveyance content along the selected first conveyance route;
determining a change in a situation of the at least one second user subsequent to the output of the first information;
managing, based on the change in the situation of the at least one second user, second information that indicates a degree of possibility of an execution of the task;
changing, based on the second information, the executor of the task from the at least one second user to a third user of the plurality of users;
selecting, based on the change, a second conveyance route of the plurality of conveyance routes, wherein the second conveyance route includes the third user as the executor of the task; and
outputting the first information that indicates the conveyance content along the selected second conveyance route.

2. An information processor, comprising:
circuitry configured to:
manage a task inputted by a first user of a plurality of users;

generate a plurality of conveyance routes to communicate conveyance content to a node of a conveyance destination, wherein
each of the plurality of conveyance routes comprises, as transit nodes, a node of a device and a node of a person, and
the conveyance content is associated with the task;
select a first conveyance route from the plurality of conveyance routes, wherein the selected first conveyance route includes, as the node of the conveyance destination, an executor of the task, wherein
the executor of the task corresponds to at least one second user of the plurality of users, and
the at least one second user is different from the first user;
output first information that indicates the conveyance content along the selected first conveyance route;
determine a change in a situation of the at least one second user subsequent to the output of the first information;
manage, based on the change in the situation of the at least one second user, second information that indicates a degree of possibility of an execution of the task;
change, based on the second information, the executor of the task from the at least one second user to a third user of the plurality of users;
select, based on the change, a second conveyance route of the plurality of conveyance routes, wherein the second conveyance route includes the third user as the executor of the task; and
output the first information that indicates the conveyance content along the selected second conveyance route.

3. The information processor according to claim 2, wherein the circuitry is further configured to:
manage third information associated with the device owned by the at least one second user; and
generate the plurality of conveyance routes based on the third information.

4. The information processor according to claim 3, wherein the circuitry is further configured to:
determine a location of each user of the plurality of users; and
generate the plurality of conveyance routes based on the location of the at least one second user.

5. The information processor according to claim 4, wherein the circuitry is further configured to update the plurality of conveyance routes based on the location of the at least one second user.

6. The information processor according to claim 2, wherein
the circuitry is further configured to change the executor of the task to the third user based on a value of the degree of possibility of the execution of the task with the at least one second user as the executor, and
the value of the degree of possibility is less than a threshold value.

7. The information processor according to claim 2, wherein the circuitry is further configured to:
select an output scheme based on at least one of the situation or an attribute of the person corresponding to a transit node of the transit nodes, and
output the first information that indicates the conveyance content based on the selected output scheme.

8. The information processor according to claim 7, wherein the circuitry is further configured to select a transmission of the output by voice as the output scheme based on a location of the person, corresponding to the transit node, that is in a proximity of the information processor.

9. The information processor according to claim 7, wherein the circuitry is further configured to select a transmission of the output by voice as the output scheme based on an age of the person that is less than a threshold age.

10. The information processor according to claim 2, wherein
the circuitry is further configured to verify a validity of the execution of the task, and
the verification is based on at least one of a past situation or a pre-defined criterion.

11. The information processor according to claim 2, wherein the circuitry is further configured to manage the task inputted by at least one of voice or text data.

12. The information processor according to claim 2, wherein the circuitry is further configured to:
detect a content of a conversation between the plurality of users;
record the content of the conversation; and
verify a validity of the execution of the task, wherein the verification is based on the recorded content of the conversation.

13. A non-transitory computer-readable medium having stored thereon computer-executable instructions which, when executed by a processor, cause the processor to execute operations, the operations comprising:
managing a task inputted by a first user of a plurality of users;
generating a plurality of conveyance routes to communicate conveyance content to a node of a conveyance destination, wherein
each of the plurality of conveyance routes comprises, as transit nodes, a node of a device and a node of a person, and
the conveyance content is associated with the task;
selecting a first conveyance route from the plurality of conveyance routes, wherein the selected first conveyance route includes, as the node of the conveyance destination, an executor of the task, wherein
the executor of the task corresponds to at least one second user of the plurality of users, and
the at least one second user is different from the first user;
outputting first information that indicates the conveyance content along the selected first conveyance route;
determining a change in a situation of the at least one second user subsequent to the output of the first information;
managing, based on the change in the situation of the at least one second user, second information that indicates a degree of possibility of an execution of the task;
changing, based on the second information, the executor of the task from the at least one second user to a third user of the plurality of users;
selecting, based on the change, a second conveyance route of the plurality of conveyance routes, wherein the second conveyance route includes the third user as the executor of the task; and
outputting the first information that indicates the conveyance content along the selected second conveyance route.

* * * * *